United States Patent
Keating et al.

(10) Patent No.: US 12,245,184 B2
(45) Date of Patent: Mar. 4, 2025

(54) USER EQUIPMENT (UE)-BASED POSITIONING NON-LINE OF SIGHT (NLOS) ERROR MITIGATION

(71) Applicant: Nokia Technologies Oy, Espoo (FI)

(72) Inventors: Ryan Keating, Chicago, IL (US); Manivannan Thyagarajan, Coppell, TX (US); Howard Huang, New York, NY (US)

(73) Assignee: NOKIA TECHNOLOGIES OY, Espoo (FI)

( * ) Notice: Subject to any disclaimer, the term of this patent is extended or adjusted under 35 U.S.C. 154(b) by 284 days.

(21) Appl. No.: 17/781,404

(22) PCT Filed: Nov. 4, 2020

(86) PCT No.: PCT/EP2020/080903
§ 371 (c)(1),
(2) Date: Jun. 1, 2022

(87) PCT Pub. No.: WO2021/115687
PCT Pub. Date: Jun. 17, 2021

(65) Prior Publication Data
US 2023/0007615 A1    Jan. 5, 2023

Related U.S. Application Data

(60) Provisional application No. 62/947,356, filed on Dec. 12, 2019.

(51) Int. Cl.
*H04W 64/00*    (2009.01)
*H04W 24/10*    (2009.01)

(52) U.S. Cl.
CPC ........... *H04W 64/00* (2013.01); *H04W 24/10* (2013.01)

(58) Field of Classification Search
CPC ..................................................... H04W 64/00
See application file for complete search history.

(56) References Cited

U.S. PATENT DOCUMENTS

2009/0069029 A1 * 3/2009 Guvenc ..................... G01S 5/14
                                                                    455/456.1
2012/0310573 A1    12/2012 Sesia et al.
(Continued)

FOREIGN PATENT DOCUMENTS

| CN | 1592471 A | 3/2005 |
| CN | 109564271 A | 4/2019 |

(Continued)

OTHER PUBLICATIONS

"Revised SID: Study on NR positioning support", 3GPP TSG RAN Meeting #81, RP-182155, Agenda: 9.3.18, Intel Corporation, Sep. 10-13, 2018, 6 pages.

(Continued)

*Primary Examiner* — Kevin Kim
(74) *Attorney, Agent, or Firm* — Lippes Mathias LLP

(57) ABSTRACT

Systems, methods, apparatuses, and computer program products for user equipment (UE)-based positioning non-line of sight (NLOS) error mitigation. For example, some embodiments described herein may provide for use of a blind-learning-type algorithm for channel bias distribution estimation for UE-based positioning. The UE may perform a calculation of a positioning of the UE using NLOS bias distribution received from a network node, as described elsewhere herein.

17 Claims, 7 Drawing Sheets

(56) References Cited

U.S. PATENT DOCUMENTS

| | | | |
|---|---|---|---|
| 2013/0033999 A1 | 2/2013 | Siomina et al. | |
| 2017/0078897 A1 | 3/2017 | Duan et al. | |
| 2018/0329023 A1* | 11/2018 | Perez-Cruz | ............ G01S 5/021 |

FOREIGN PATENT DOCUMENTS

| | | |
|---|---|---|
| CN | 109752690 A | 5/2019 |
| EP | 1605725 A1 | 12/2005 |
| EP | 2320593 A1 | 5/2011 |

OTHER PUBLICATIONS

"3rd Generation Partnership Project; Technical Specification Group Radio Access Network; Study on NR positioning support (Release 16)", 3GPP TR 38.855, V16.0.0, Mar. 2019, pp. 1-197.

"New WID: NR Positioning Support", 3GPP TSG RAN Meeting #83, RP-190752, Agenda: 9.1.1, Intel Corporation, Mar. 18-21, 2019, 6 pages.

Cruz et al., "Blade: A universal, blind learning algorithm for ToA localization in NLOS channels", IEEE Globecom Workshops (GC Wkshps), Dec. 4-8, 2016, 7 pages.

U.S. Appl. No. 14/706,339, "Method and Apparatus for Determining Non-Line of Sight Bias Estimation", filed on May 7, 2015, pp. 1-29.

International Search Report and Written Opinion received for corresponding Patent Cooperation Treaty Application No. PCT/EP2020/080903, dated Feb. 4, 2021, 18 pages.

Ma et al., "RSRP difference elimination and motion state classification for fingerprint-based cellular network positioning system", Telecommunication Systems, vol. 71, 2019, pp. 191-203.

Office action received for corresponding Indian Patent Application No. 202247038625, dated Oct. 20, 2022, 5 1 pages.

Office action received for corresponding Chinese Patent Application No. 202080086486.9, dated Nov. 11, 2024, 2024, 12 pages of office action and No. page of translation available.

Office action received for corresponding European Patent App. No. 20800918.3, dated Nov. 18, 2024, 4 pages.

\* cited by examiner

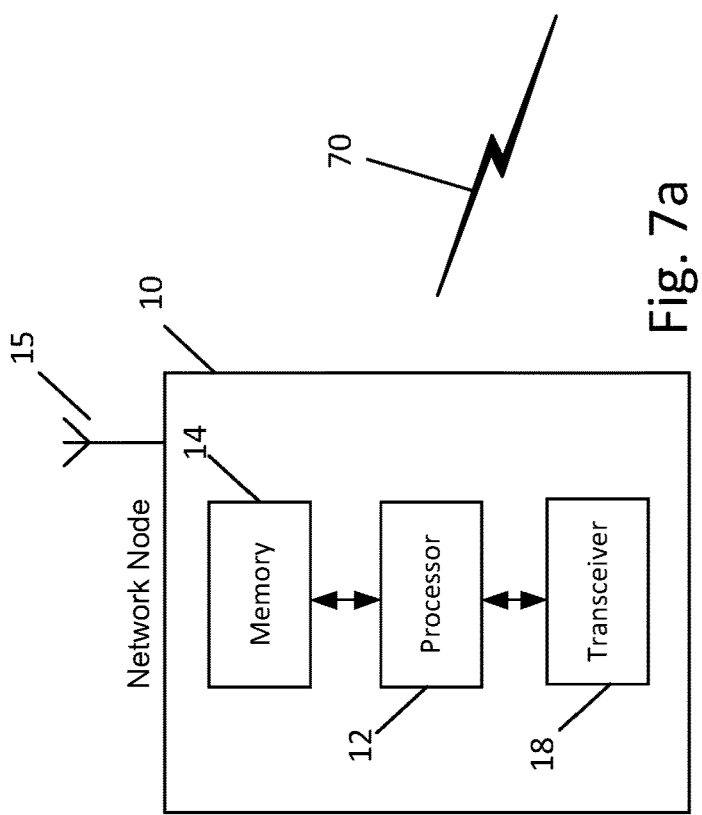
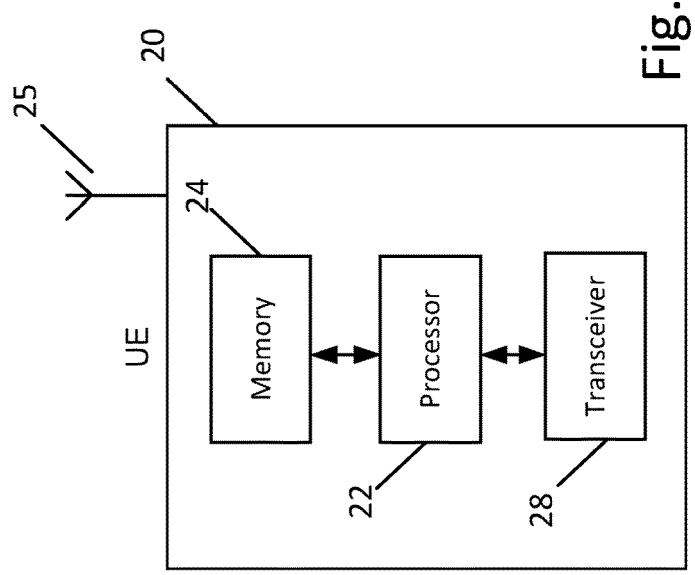
Fig. 7a
Fig. 7b

//USER EQUIPMENT (UE)-BASED POSITIONING NON-LINE OF SIGHT (NLOS) ERROR MITIGATION

RELATED APPLICATION

This application was originally filed as PCT Application No. PCT/EP2020/080903, filed on Nov. 4, 2020, which claims priority from U.S. Provisional Application No. 62/947,356, filed on Dec. 12, 2019, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for user equipment (UE)-based positioning non-line of sight (NLOS) error mitigation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

BRIEF DESCRIPTION OF THE DRAWINGS

For proper understanding of example embodiments, reference should be made to the accompanying drawings, wherein:

FIG. 7a illustrates an example block diagram of an apparatus, according to an embodiment; and FIG. 7b illustrates an example block diagram of an apparatus, according to another embodiment.

DETAILED DESCRIPTION

Figure 1:
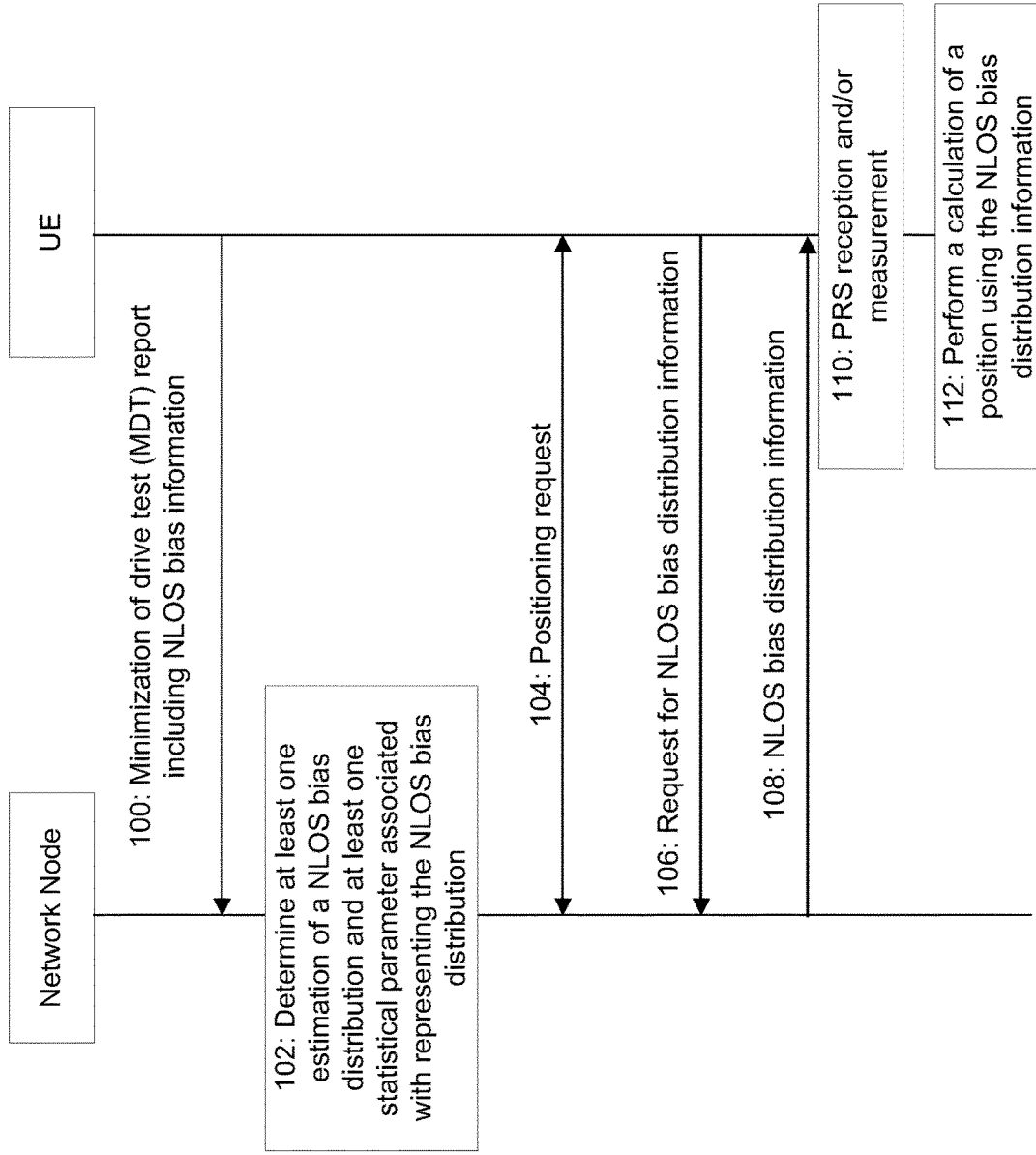
FIG. 1 illustrates an example signal diagram for UE-based positioning NLOS error mitigation, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for UE-based positioning NLOS error mitigation is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

UE-based positioning may refer to when a UE is the device that is performing the actual positioning calculation. In cellular networks, the network side has typically performed the positioning calculation based on measurement reports made either at the UE or at the network side (e.g., at the location management function (LMF)). UE-based positioning may reduce the latency needed relative to downlink (DL) UE-assisted positioning since the UE may not have to make any measurement reports to the network before the position calculation can be done by the network. This latency reduction may be, for example, important for use cases with tight latency needs, such as for private networks or vehicle-to-everything (V2X) applications. During UE-based positioning, the location of one or more network nodes (e.g., gNBs) may have to be signalled to the UE so that it can perform the positioning calculation locally.

In LTE, one of the commonly deployed positioning solutions is observed time difference of arrival (OTDOA). NR OTDOA (which may be referred to as downlink time difference of arrival (DL-TDOA)) may be implemented in NR. Using DL signals, the time difference of arrival (TDOA) between multiple network nodes' transmissions may be estimated at a UE. In LTE, the DL signal used for OTDOA may be called the positioning reference signal (PRS), which may again be introduced. The UE may measure the reference signal time difference (RSTD) using PRSs from different cells and may report the RSTD measurements to a location server, as an example of a network node. The UE may communicate with the location server using the LTE positioning protocol (LPP). The location server, which may be called an LMF in NR, may then use the known positions of the network nodes (e.g., base stations) and the RSTD measurements to calculate the position of the UE. In the case of UE-based positioning, the positions of the network nodes may be communicated to the UE and, therefore, the RSTD measurement report may not have to be sent.

One challenge for positioning using radio frequency (RF) signals may include the existence of NLOS conditions. For timing-based techniques, the time of arrival of the signal may be positively biased away from the true propagation time of the signal between devices due to the additional time it takes for the signals to arrive in NLOS conditions. Additional bias of the time of arrival of the signal on the order of tens to hundreds of nanoseconds (ns) may not be atypical for NLOS signals in cellular environments, for example. In this example, 50 ns of bias of the time of arrival of the signal may cause a ranging error of 15 meters (m) if uncompensated. To be sufficient for many commercial use cases for NR positioning, it may be needed to address the NLOS bias of time of arrival of the signal.

One possible solution to the NLOS bias problem for positioning is to use a blind learning-type algorithm for channel bias distribution estimation (which may be referred to as a NLOS mitigation algorithm or a channel bias estimation). A blind learning-type algorithm may learn the distribution of the bias of the time of arrival caused by NLOS conditions and may use this to improve the positioning accuracy.

Some embodiments described herein may provide for use of a blind-learning-type algorithm for channel bias distribution estimation for UE-based positioning. For example, the UE may perform a calculation of a positioning of the UE using NLOS bias distribution information received from a network node, as described elsewhere herein. In this way, the UE may perform UE-based positioning, which may reduce latency relative to network node-based positioning. Reducing latency may improve communications between devices, and in particular, URLLC communications.

FIG. 1 illustrates an example signal diagram for UE-based positioning NLOS error mitigation, according to some embodiments. FIG. 1 illustrates a network node (e.g., an LMF, a base station, and/or the like) and a UE.

As illustrated at 100, the UE may transmit, and the network node may receive, a minimization drive test (MDT) report including NLOS bias information. The NLOS bias information may include reference signal time difference (RSTD)-related information or time of arrival (TOA)-related measurements. This may provide UE reporting of NLOS bias information as a new MDT measurement so that it can be gathered and used using the MDT mechanism. The UE NLOS bias information report may include a collection of RSTD measurements over time or a collection of RSTD bias estimates over time.

The NLOS bias information may be reported in a UEInformationResponse radio resource control (RRC) message to a network node (e.g., a gNB), which the network node may distribute to another network node (e.g., a LMF) using new radio positioning protocol A (NRPPa) (in some embodiments, NLOS bias information may be reported directly to a network node (e.g., a LMF) using the long-term evolution positioning protocol (LPP)). The full RSTD measurement report used in LPP may not be needed when the MDT reporting mechanism is used. The collection of RSTD measurements and RSTD bias estimates may be tailored for use by the network node (e.g., the LMF) for blind-learning-type algorithms as the RSTD measurements reported in MDT may not be used to compute the UE location by the network node. The UE may report locally computed statistical parameters (described elsewhere herein) or may report a performance of a latest blind learning algorithm model for network evaluation/refinement.

As illustrated at 102, the network node may determine at least one estimation of a NLOS bias distribution and at least one statistical parameter associated with representing the NLOS bias distribution. For example, the network node may perform an estimation of NLOS bias distribution based on one or more reporting mechanisms. Although some embodiments are described in the context of DL-TDOA, certain embodiments described here may apply equally to observed time difference of arrival (OTDOA).

The statistical parameters may include a mean of a mixture of Gaussian distributions of NLOS bias (e.g., a mixture of Gaussian distributions may be a Gaussian distribution of multiple Gaussian distributions), a standard deviation of the mixture of Gaussian distributions of NLOS bias, a weight of Gaussian distributions included in the mixture of Gaussian distributions, and/or the like. These parameters may be associated with recreating or representing an NLOS bias distribution. The network node may also report how many RSTD measurements it used to calculate the statistical parameters.

Figure 2:
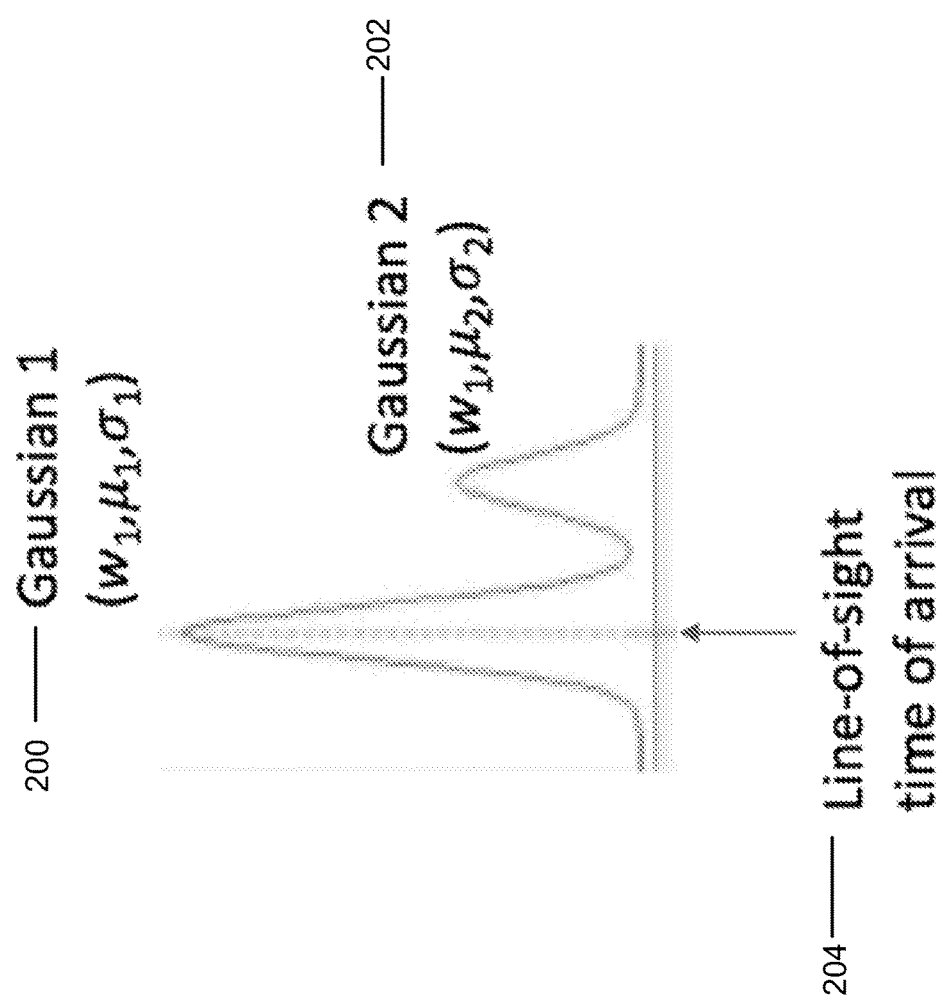
FIG. 2 illustrates an example probability distribution function for NLOS bias, according to some embodiments.

As one example, in some scenarios, two Gaussian distributions may be sufficient to represent the NLOS bias distribution. In this case, two weights, two means, and two standard deviations may be included in the statistical parameters. FIG. 2, described below, illustrates an example of how the distribution may be visualized and the parameters that describe it. Each of the parameters may be represented by a certain number of bits in a message or in signalling. The number of bits may depend on the overall positioning accuracy that is desired. In certain embodiments, the statistical parameters may be any statistical parameter that can be used to represent the NLOS bias distribution, which may be different than the example parameters described above for a mixture of Gaussian distributions. In some embodiments, the NLOS bias distribution may be different than a Gaussian distribution, such as a Poisson distribution, an exponential distribution, and/or the like.

In some embodiments, the number of distributions used may differ depending on the type of device performing the blind learning algorithm For example, the mean and standard deviation of three Gaussian distributions may be sufficient for an entity other than the network node to recreate the NLOS bias distribution and to, therefore, use a blind learning algorithm As illustrated at 104, the UE and the network node may communicate with each other to perform a positioning request. As illustrated at 106, the UE may transmit, and the network node may receive, a request for NLOS bias distribution information. For example, a UE performing UE based positioning may request NLOS bias distribution information. This request may be in the form of an accuracy threshold (e.g., the UE may request accuracy above or below a threshold and the network node (e.g., the LMF) may determine that the UE-based blind learning algorithm is to be used based on this). The accuracy threshold may also be in the form of Quality of Service (QoS) information. Additionally, or alternatively, the request may include subscription information that identifies a subscription of the UE (e.g., the network node may determine NLOS bias distribution information based on the subscription). The request may be sent over LPP, for example, and may be an extension of an LPP OTDOA-RequestAssistanceData information element (IE).

A timer may be configured by the network node and expiration of the timer may be tracked by the UE to determine when the NLOS bias distribution information is outdated. In some embodiments, the network node may signal the UE that new NLOS bias distribution information is available and may then transmit the NLOS bias distribution information to the UE. For example, updating NLOS bias distribution information may occur in the case of a dynamic environment change that may have an updated model.

In some embodiments, the network node may determine to transmit the NLOS bias distribution information without receiving a request for the NLOS bias distribution information (e.g., based on a subscription of the UE). For example, the network node may store subscription information for particular UEs and may transmit the NLOS bias distribution information based on this subscription (e.g., the network node may determine which UEs pay for use of a UE-based blind learning algorithm and may signal parameters to that UE when it is configured for DL-TDOA).

As illustrated at 108, the network node may transmit, and the UE may receive, the NLOS bias distribution information. This transmission may occur over LPP, for example, and may be an extension of the LPP OTDOA-ProvideAssistanceData IE. The non-line of sight (NLOS) bias distribution information may include a statistical parameter associated with representing a NLOS bias distribution. For example, the NLOS bias distribution may include the number of Gaussian distributions included in the mixture of Gaussian distributions (which may represent the NLOS bias distribution), the mean of the Gaussian distributions, the variance of the Gaussian distributions, and/or the like.

Additionally, or alternatively, the NLOS bias distribution information may be associated with information that identifies a location of one or more gNBs (or other network nodes). The statistics of the bias may be relatively stable over time due to relatively consistent operation of the gNBs over time. As a result, to save on downlink bandwidth, the bias parameters may not have to be communicated by the network node to a UE if the UE already received the values for those parameters and if the values have not changed. Similarly, the gNB locations may not change with time. As a result, the network node may not have to communicate this information if the UE received it previously.

As illustrated at 110, the UE may perform a positioning reference signal (PRS) reception and/or measurement. As illustrated at 112, the UE may perform a calculation of a position of the UE using the NLOS bias distribution information. In some embodiments, performing the calculation may comprise computing a bias realization for the network node. For example, for a given positioning estimate of the UE (e.g., obtained through use of a blind learning algorithm), the UE may compute a bias realization for each gNB by subtracting the measured time of flight (derived from the RSTD for that gNB and the estimated transmit time) from a line of sight (LOS) time of flight determined from the distance between the gNB and the estimated UE position.

In this way, some embodiments described herein facilitate the use of a blind learning algorithm during UE-based positioning by providing signalling for the UE to obtain an NLOS bias distribution. The use of a blind learning algorithm may facilitate the UE calculating its position more accurately while still doing so in a low latency manner (due to these operations being UE based). Without obtaining the NLOS bias distribution, UE-based positioning relying on timing-based techniques, such as DL-TDOA, may be limited in the accuracy it can achieve. The network derivation of a NLOS bias distribution may be performed using the MDT measurements gathered and provided to the network node (e.g., a positioning server). Providing this information to a positioning server may facilitate improved calculation of NLOS bias distributions based on a large quantity of UEs reporting the NLOS bias information to the positioning server.

As described above, FIG. 1 is provided as an example. Other examples are possible, according to some embodiments.

FIG. 2 illustrates an example probability distribution function for NLOS bias, according to some embodiments. Specifically, FIG. 2 illustrates an example visualization of a NLOS bias distribution that may be used for a blind learning algorithm and the parameters that may be used to represent it. The NLOS bias distribution may comprise a mixture of Gaussian distributions n (n=1, 2, for example). Gaussian n may be parameterized by a weight ($w_n$), a mean ($\mu_n$), and standard deviation ($\sigma_1$). As illustrated at 200, the NLOS bias distribution may be based on a first Gaussian distribution (Gaussian 1), which may be based on parameters $w_1$, $\mu_1$, and $\sigma_1$. As illustrated at 202, the NLOS bias distribution may be based on a second Gaussian distribution (Gaussian 2), which may be based on parameters similar to that described for Gaussian 1. As illustrated at 204, the LOS time of arrival may be represented by the NLOS bias distribution.

As indicated above, FIG. 2 is provided as an example. Other examples are possible, according to some embodiments.

Figure 3:
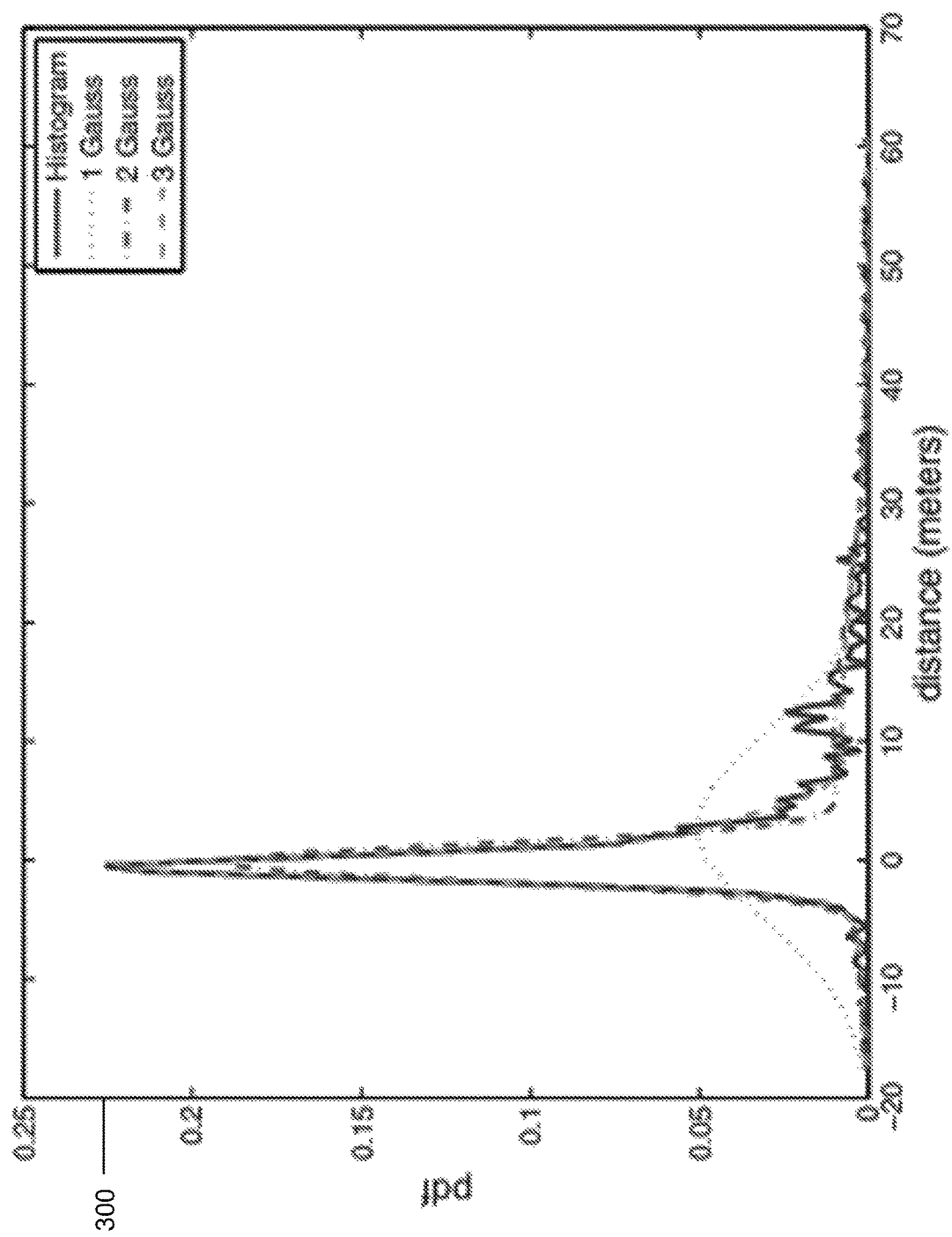
FIG. 3 illustrates a mixture of Gaussian approximations of a NLOS bias histogram, according to some embodiments.

FIG. 3 illustrates a mixture of Gaussian approximations of a NLOS bias histogram, according to some embodiments. For example, FIG. 3 illustrates a visualization 300 of a mixture of Gaussian approximations of an NLOS bias histogram with a varying number of Gaussian distributions included in the model.

A probability distribution function (PDF) of the NLOS bias may be calculated. For example, the NLOS bias information may be determined based on the following equation:

$$\gamma_{tj}^{\neg j} = (\text{ToA}_{tj} - \hat{\tau}_{tj}^{\neg j}) - (\sqrt{\|\hat{x}_t^{147j} - \bar{x}_j\|^2})/c$$

where $\gamma_{tj}^{\neg j}$ is the NLOS bias of a $t^{th}$ tag message at a $j^{th}$ anchor and ¬j symbolizes that the determination was based on time of arrivals (ToAs) from the tag message at all of the anchors except the $j^{th}$ anchor. A tag message may include any type of message delivered by a tag over a period of time. A tag may be any type of communication device(s) capable of sending a wireless signal (e.g., a tag message) over one or more of tag communication channels. An anchor may include any type of communication device(s) capable of receiving tag messages over and an appropriate tag communication channel, determining a ToA of the tag message, and transmitting the ToA information and information identifying the tag message to a server via an appropriate server communication channel $\text{ToA}_{tj}$ is the ToA of the $t^{th}$ tag message at the $j^{th}$ anchor. $\hat{\tau}_{tj}^{\neg j}$ is the estimated transmission time of the tag transmitting the tth tag message with reference to a jth anchor clock and ¬j symbolizes that the determination was based on ToAs from the tag message at all of the anchors except the jth anchor. $\hat{x}_t^{\neg j}$ is the estimated location of the tag transmitting the $t^{th}$ tag message and ¬j symbolizes that the location determination was based on ToAs from the tag message at all of the anchors except the $j^{th}$ anchor. $\bar{x}_j$ is the known location of the $j^{th}$ anchor. c is the speed of light.

This calculation may be done at the network node (e.g., the LMF) based on a set of RSTD measurements and corresponding UE location estimates. Given this PDF, the network node may approximate the function using a mixture of Gaussian distributions and may determine the parameters (e.g., weights, means, standard deviations) using a curve-fitting technique (e.g., where a curve or mathematical function, which has the best fit to a series of data points, is constructed). FIG. 3 illustrates an example of how using a mixture of Gaussian distributions improves the PDF of the bias by adding more Gaussians to the model. For example, the mixture of three Gaussian distributions (3 Gauss) has the closest approximation to the histogram relative to the mixture of one Gaussian distribution (1 Gauss) and two Gaussian distributions (2 Gauss).

As described above, FIG. 3 is provided as an example. Other examples are possible, according to some embodiments.

Figure 4:
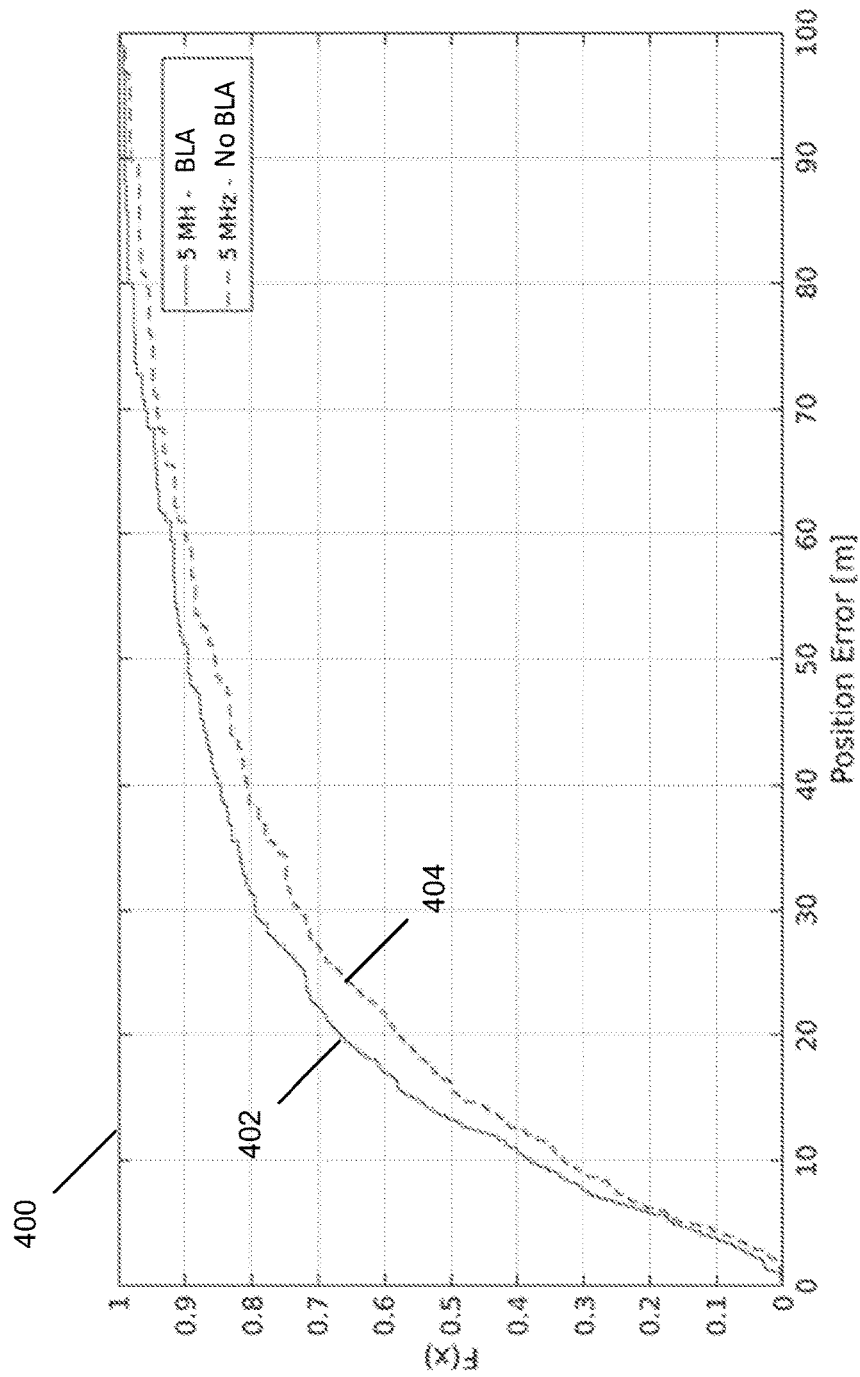
FIG. 4 illustrates example downlink time difference of arrival (DL-TDOA) positioning errors with a 5 megahertz (MHz) positioning reference signal (PRS), according to some embodiments.

FIG. 4 illustrates example downlink time difference of arrival (DL-TDOA) positioning errors with a 5 megahertz (MHz) positioning reference signal (PRS), according to some embodiments. For example, FIG. 4 shows a visualization 400 of a horizontal positioning error for DL-TDOA with a 5 megahertz (MHz) bandwidth PRS both with a blind learning algorithm (labelled as "BLA" in FIG. 4), illustrated at 402, and without a blind learning algorithm (labelled as "No BLA" in FIG. 4), illustrated at 404, in an urban macro environment.

Some embodiments described herein may be used for various carrier frequencies and bandwidths. Using a blind learning algorithm may perform well and, in particular, may be a solution for the wide bandwidths in NR. Certain embodiments described herein may have the advantage of enabling UE-based utilization of a blind learning algorithm for channel bias distribution estimation for UE-based positioning so that UE-based positioning may perform higher accuracy positioning with DL-TDOA.

As described above, FIG. 4 is provided as an example. Other examples are possible, according to some embodiments.

Figure 5:
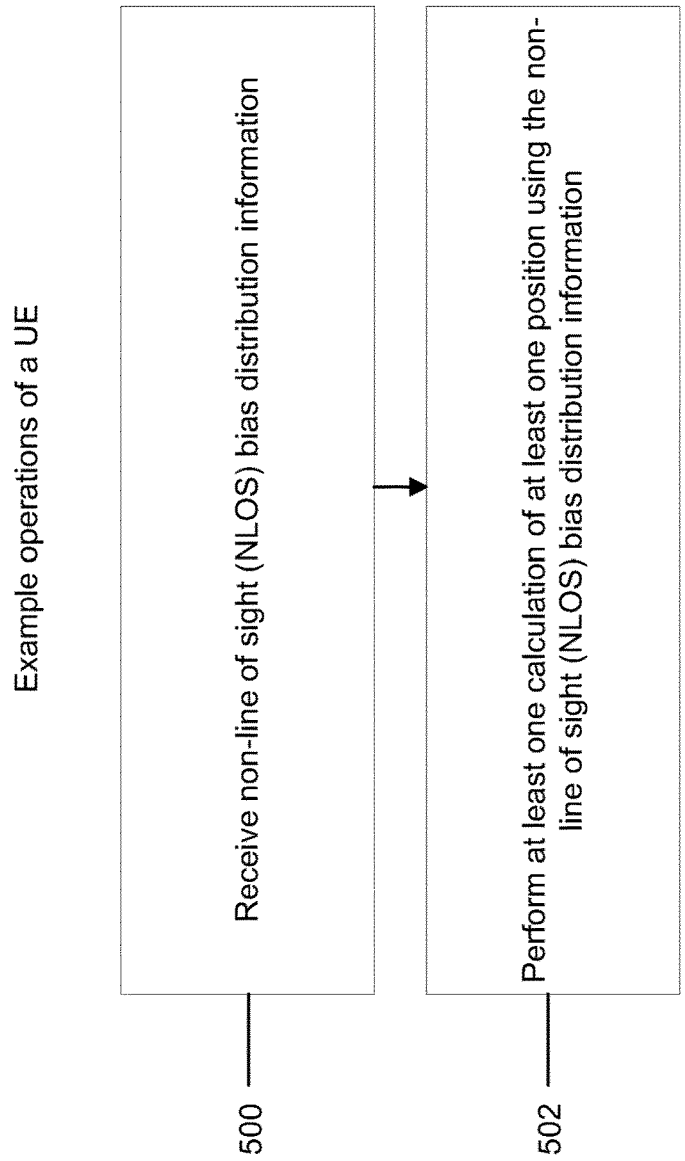
FIG. 5 illustrates an example flow diagram of a method, according to some embodiments.

FIG. 5 illustrates an example flow diagram of a method, according to some embodiments. For example, FIG. 5 shows example operations of a UE (e.g., similar to apparatus 20). Some of the operations illustrated in FIG. 5 may be similar to some operations shown in, and described with respect to, FIGS. 1-4.

In an embodiment, the method may include, at 500, receiving non-line of sight (NLOS) bias distribution information. The non-line of sight (NLOS) bias distribution information may include at least one statistical parameter associated with representing at least one non-line of sight (NLOS) bias distribution. In an embodiment, the method may include, at 502, performing at least one calculation of at least one position using the non-line of sight (NLOS) bias distribution information.

In some embodiments, the method may include transmitting at least one minimization of drive test (MDT) report that includes non-line of sight (NLOS) bias information. In some embodiments, the non-line of sight (NLOS) bias information may include reference signal time difference (RSTD)-related information or time of arrival (TOA)-related measurements. In some embodiments, the reference signal time difference (RSTD)-related information may comprise at least one of at least one reference signal time difference (RSTD) measurement over time, or at least one reference signal time difference (RSTD) bias estimate over time. In some embodiments, the non-line of sight (NLOS) bias information may further comprises at least one local non-line of sight (NLOS) bias distribution.

In some embodiments, the non-line of sight (NLOS) bias information may be included in at least one radio resource control (RRC) message or may be provided using long-term evolution positioning protocol (LPP). In some embodiments, the method may include determining whether the non-line of sight (NLOS) bias distribution information is outdated based on at least one timer. In some embodiments, the method may include determining whether the NLOS bias distribution information is outdated based on local sensor data or measured channel condition changes. In some embodiments, the method may include providing at least one request for the non-line of sight (NLOS) bias distribution information prior to receiving the non-line of sight (NLOS) bias distribution information. In some embodiments, providing the at least one request for the non-line of sight (NLOS) bias distribution information may be based on the user equipment (UE) performing, or determining to perform, at least one user equipment (UE)-based positioning.

In some embodiments, the at least one request may comprise information identifying at least one of at least one accuracy threshold associated with performing the at least one user equipment (UE)-based positioning, or subscription information associated with the user equipment (UE). In some embodiments, providing the at least one request may further comprise providing the at least one request using the long-term evolution positioning protocol (LPP). In some embodiments, providing the at least one request may further comprise providing the at least one request in association with at least one downlink time difference of arrival (DL-TDOA) information element (IE).

In some embodiments, providing the at least one request may further comprise providing the at least one request based on receiving at least one indication that the non-line of sight (NLOS) bias distribution information is available. In some embodiments, receiving the non-line of sight (NLOS) bias distribution information may further comprise receiving the non-line of sight (NLOS) bias distribution information using the long-term evolution positioning protocol (LPP). In some embodiments, receiving the non-line of sight (NLOS) bias distribution information may further comprise receiving the non-line of sight (NLOS) bias distribution information in association with at least one downlink time difference of arrival (DL-TDOA) information element (IE). In some embodiments, the at least one statistical parameter may comprise at least one of at least one mean of at least one mixture of Gaussian distributions of non-line of sight (NLOS) bias, at least one standard deviation of the at least one mixture of Gaussian distributions of non-line of sight (NLOS) bias, and at least one weight corresponding to Gaussian distributions included in the at least one mixture of Gaussian distributions.

In some embodiments, the non-line of sight (NLOS) bias distribution may comprise at least one of a number of Gaussian distributions in the at least one mixture of Gaussian distributions, at least one mean of at least one Gaussian distribution included in the at least one mixture of Gaussian distributions, and at least one variance of at least one Gaussian distribution included in the at least one mixture of Gaussian distributions. In some embodiments, performing the calculation of the at least one position may comprise computing at least one bias realization for at least one network node. In some embodiments, computing the at least one bias realization may further comprise computing the at least one bias realization by subtracting at least one measured time of flight from at least one line of sight (LOS) time of flight determined from at least one distance between at least one network node and at least one estimated user equipment (UE) position.

In some embodiments, the non-line of sight (NLOS) bias distribution information may be associated with information that identifies locations of at least one network node. In some embodiments, at least one value of the at least one statistical parameter may be a different value than for at least one previously received parameter. In some embodiments, receiving the non-line of sight (NLOS) bias distribution information may further comprise receiving the non-line of sight (NLOS) bias distribution information based on at least one subscription associated with the user equipment (UE).

As described above, FIG. 5 is provided as an example. Other examples are possible according to some embodiments.

Figure 6:
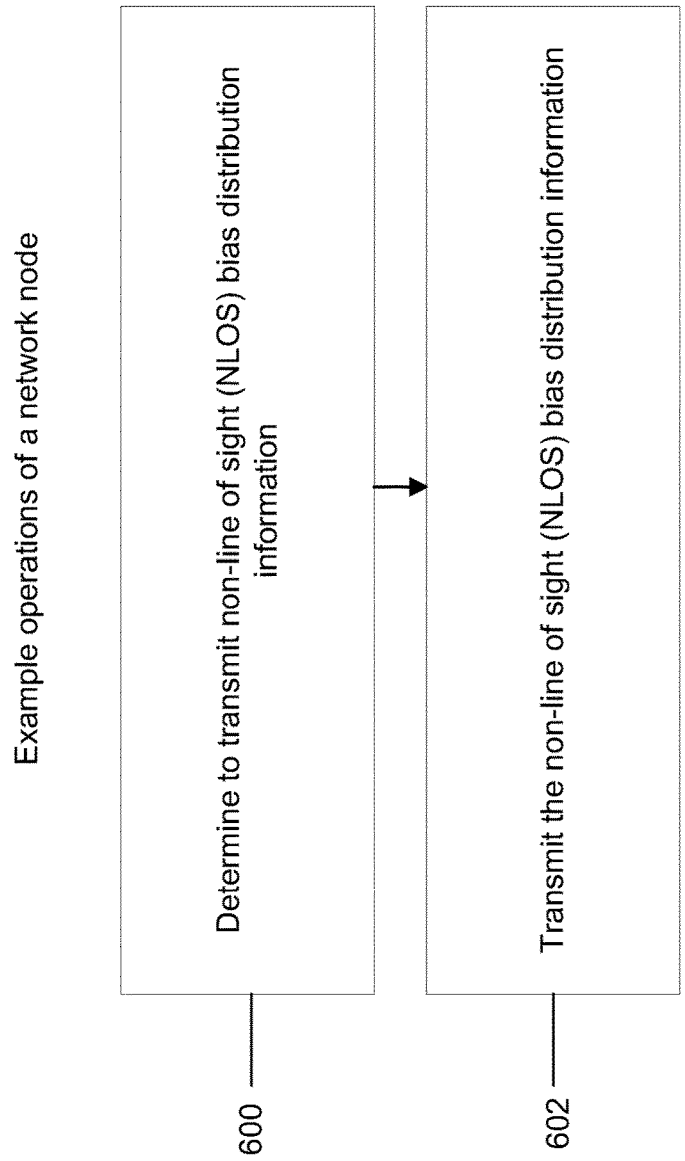
FIG. 6 illustrates an example flow diagram of a method, according to some embodiments.

FIG. 6 illustrates an example flow diagram of a method, according to some embodiments. For example, FIG. 6 shows example operations of a network node (e.g., similar to apparatus 10). Some of the operations illustrated in FIG. 6 may be similar to some operations shown in, and described with respect to, FIGS. 1-4.

In an embodiment, the method may include, at 600, determining to transmit non-line of sight (NLOS) bias distribution information. The non-line of sight (NLOS) bias distribution information may include at least one statistical parameter associated with representing at least one non-line of sight (NLOS) bias distribution. In an embodiment, the method may include, at 602, transmitting the non-line of sight (NLOS) bias distribution information.

In some embodiments, the method may include receiving at least one minimization of drive test (MDT) report that includes non-line of sight (NLOS) bias information. In some embodiments, the non-line of sight (NLOS) bias information may include reference signal time difference (RSTD)-related information or time of arrival (TOA)-related measurements. In some embodiments, the reference signal time difference (RSTD)-related information may comprise at least one of at least one reference signal time difference (RSTD) measurement over time, or at least one reference signal time difference (RSTD) bias estimate over time. In some embodiments, the non-line of sight (NLOS) bias information may further comprise at least one local non-line of sight (NLOS) bias distribution. In some embodiments, the non-line of sight (NLOS) bias information may be included in at least one radio resource control (RRC) message or may be provided using the new radio positioning protocol A (NRPPa) (e.g., to an LMF via a gNB), or may be provided using the long-term evolution positioning protocol (LPP) (e.g., directly to an LMF).

In some embodiments, the method may include determining at least one estimation of at least one non-line of sight (NLOS) bias distribution and at least one statistical parameter associated with representing the at least one non-line of sight (NLOS) bias distribution. In some embodiments, determining the at least one estimation of the at least one non-line of sight (NLOS) bias distribution may be based on at least one of at least one network-based downlink time difference of arrival (DL-TDOA) positioning-related measurement report, or at least one non-line of sight (NLOS) bias report gathered using at least one minimization of drive test (MDT) mechanism. In some embodiments, the at least one network-based downlink time difference of arrival (DL-TDOA) positioning-related measurement report may comprise at least one reference signal time difference (RSTD)-related measurement report performed during at least one network-based positioning.

In some embodiments, the at least one non-line of sight (NLOS) bias report gathered using the at least one minimization of drive test (MDT) mechanism may comprise at least one of at least one reference signal time difference (RSTD)-related measurement, or at least one reference signal time difference (RSTD)-related bias estimate, or wherein the non-line of sight (NLOS) bias information further comprises at least one local non-line of sight (NLOS) bias distribution. In some embodiments, the at least one statistical parameter may comprise at least one of at least one mean of at least one mixture of Gaussian distributions of non-line of sight (NLOS) bias, at least one standard deviation of the at least one mixture of Gaussian distributions of non-line of sight (NLOS) bias, and at least one weight corresponding to Gaussian distributions included in the at least one mixture of Gaussian distributions. In some embodiments, the method may include transmitting information that identifies at least one quantity of reference signal time difference (RSTD)-related measurement used to calculate the at least one statistical parameter.

In some embodiments, the method may include receiving at least one request for the non-line of sight (NLOS) bias distribution information. In some embodiments, the at least one request may further comprise information that identifies at least one of at least one accuracy threshold associated with at least one user equipment (UE)-based positioning, or at least one subscription associated with the at least one user equipment (UE). In some embodiments, receiving the at least one request may further comprise receiving the at least one request using the long-term evolution positioning protocol (LPP).

In some embodiments, receiving the at least one request may further comprises receiving the at least one request in association with at least one downlink time difference of arrival (DL-TDOA) information element (IE). In some embodiments, the method may include transmitting at least one indication that the non-line of sight (NLOS) bias distribution information is available, and receiving the at least one request may further comprise receiving the at least one request based on transmitting the at least one indication. In some embodiments, the at least one non-line of sight (NLOS) bias distribution may comprise at least one of a number of Gaussian distributions in the at least one mixture of Gaussian distributions, at least one mean of at least one Gaussian distribution included in the at least one mixture of Gaussian distributions, and at least one variance of at least one Gaussian distribution included in the at least one mixture of Gaussian distributions.

In some embodiments, determining the at least one statistical parameter may be based on at least one probability distribution function (PDF). In some embodiments, the at least one probability distribution function (PDF) may be based on at least one reference signal time difference (RSTD) measurement and at least one corresponding user equipment (UE) location estimate. In some embodiments, determining the at least one statistical parameter may further comprise determining the at least one statistical parameter using at least one curve-fitting technique. In some embodiments, the non-line of sight (NLOS) bias distribution information may be associated with information that identifies at least one location of at least one network node.

In some embodiments, the method may include determining whether at least one value of the at least one statistical parameter has been previously provided, and transmitting the non-line of sight (NLOS) bias distribution information may further comprise transmitting the non-line of sight (NLOS) bias distribution information based on determining whether the at least one value of the at least one statistical parameter has been previously provided. In some embodiments, transmitting the non-line of sight (NLOS) bias distribution information may further comprise transmitting the non-line of sight (NLOS) bias distribution information using the long-term evolution positioning protocol (LPP). In some embodiments, transmitting the non-line of sight (NLOS) bias distribution information may further comprise transmitting the non-line of sight (NLOS) bias distribution information in association with at least one downlink time difference of arrival (DL-TDOA) information element (IE).

As described above, FIG. 6 is provided as an example. Other examples are possible according to some embodiments.

FIG. 7a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), an LMF, a positioning server, and/or a WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, LMF, positioning server, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-4 and 6.

For instance, in one embodiment, apparatus 10 may be controlled by memory 14 and processor 12 to determine to transmit non-line of sight (NLOS) bias distribution information. The non-line of sight (NLOS) bias distribution information may include at least one statistical parameter associated with representing at least one non-line of sight (NLOS) bias distribution. In one embodiment, apparatus 10 may be controlled by memory 14 and processor 12 to transmit the non-line of sight (NLOS) bias distribution information.

FIG. 7*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7*b*.

As illustrated in the example of FIG. 7*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-5.

For instance, in one embodiment, apparatus 20 may be controlled by memory 24 and processor 22 to receive non-line of sight (NLOS) bias distribution information. The non-line of sight (NLOS) bias distribution information may include at least one statistical parameter associated with representing at least one non-line of sight (NLOS) bias distribution. In one embodiment, apparatus 20 may be controlled by memory 24 and processor 22 to performing at least one calculation of at least one position using the non-line of sight (NLOS) bias distribution information.

Therefore, certain example embodiments provide several technological improvements, enhancements, and/or advantages over existing technological processes. For example, some benefits of some example embodiments are reduced latency with regard to determining a UE position and network resource conservation due to reduced signaling. Accordingly, the use of some example embodiments results in improved functioning of communications networks and their nodes and, therefore constitute an improvement at least to the technological field of UE positioning, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

According to a first embodiment, a method may include receiving non-line of sight (NLOS) bias distribution information. The non-line of sight (NLOS) bias distribution information may include at least one statistical parameter associated with representing at least one non-line of sight (NLOS) bias distribution. The method may include performing at least one calculation of at least one position using the non-line of sight (NLOS) bias distribution information.

In a variant, the method may include transmitting at least one minimization of drive test (MDT) report that includes non-line of sight (NLOS) bias information, wherein the non-line of sight (NLOS) bias information includes reference signal time difference (RSTD)-related information or time of arrival (TOA)-related measurements. In a variant, the reference signal time difference (RSTD)-related information may comprise at least one of at least one reference signal time difference (RSTD) measurement over time, or at least one reference signal time difference (RSTD) bias estimate over time. In a variant, the non-line of sight (NLOS) bias information may further comprises at least one local non-line of sight (NLOS) bias distribution.

In a variant, the non-line of sight (NLOS) bias information may be included in at least one radio resource control (RRC) message or is provided using the long-term evolution positioning protocol (LPP). In a variant, the method may include determining whether the non-line of sight (NLOS) bias distribution information is outdated based on at least one timer. In a variant, the method may include determining whether the NLOS bias distribution information is outdated based on local sensor data or measured channel condition changes. In a variant, the method may include providing at least one request for the non-line of sight (NLOS) bias distribution information prior to receiving the non-line of sight (NLOS) bias distribution information. In a variant, providing the at least one request for the non-line of sight (NLOS) bias distribution information may be based on the user equipment (UE) performing, or determining to perform, at least one user equipment (UE)-based positioning.

In a variant, the at least one request may comprise information identifying at least one of: at least one accuracy threshold associated with performing the at least one user equipment (UE)-based positioning, or subscription information associated with the user equipment (UE). In a variant, providing the at least one request may further comprise providing the at least one request using the long-term evolution positioning protocol (LPP). In a variant, providing the at least one request may further comprise providing the at least one request in association with at least one downlink time difference of arrival (DL-TDOA) information element (IE).

In a variant, providing the at least one request may further comprise providing the at least one request based on receiving at least one indication that the non-line of sight (NLOS) bias distribution information is available. In a variant, receiving the non-line of sight (NLOS) bias distribution information may further comprise receiving the non-line of sight (NLOS) bias distribution information using the long-term evolution positioning protocol (LPP). In a variant, receiving the non-line of sight (NLOS) bias distribution information may further comprise receiving the non-line of sight (NLOS) bias distribution information in association with at least one downlink time difference of arrival (DL-TDOA) information element (IE). In a variant, the at least one statistical parameter may comprise at least one of at least one mean of at least one mixture of Gaussian distributions of non-line of sight (NLOS) bias, at least one standard deviation of the at least one mixture of Gaussian distributions of non-line of sight (NLOS) bias, and at least one weight corresponding to Gaussian distributions included in the at least one mixture of Gaussian distributions.

In a variant, the non-line of sight (NLOS) bias distribution may comprise at least one of a number of Gaussian distributions in the at least one mixture of Gaussian distributions, at least one mean of at least one Gaussian distribution included in the at least one mixture of Gaussian distributions, and at least one variance of at least one Gaussian distribution included in the at least one mixture of Gaussian distributions. In a variant, performing the calculation of the at least one position may comprise computing at least one bias realization for at least one network node. In a variant, computing the at least one bias realization may further comprise computing the at least one bias realization by subtracting at least one measured time of flight from at least one line of sight (LOS) time of flight determined from at least one distance between at least one network node and at least one estimated user equipment (UE) position.

In a variant, the non-line of sight (NLOS) bias distribution information may be associated with information that identifies locations of at least one network node. In a variant, at least one value of the at least one statistical parameter is a different value than for at least one previously received parameter. In a variant, receiving the non-line of sight (NLOS) bias distribution information may further comprise receiving the non-line of sight (NLOS) bias distribution information based on at least one subscription associated with the user equipment (UE).

According to a second embodiment, a method may include determining to transmit non-line of sight (NLOS) bias distribution information. The non-line of sight (NLOS) bias distribution information may include at least one statistical parameter associated with representing at least one non-line of sight (NLOS) bias distribution. The method may include transmitting the non-line of sight (NLOS) bias distribution information.

In a variant, the method may include receiving at least one minimization of drive test (MDT) report that includes non-line of sight (NLOS) bias information. In a variant, the non-line of sight (NLOS) bias information may include reference signal time difference (RSTD)-related information or time of arrival (TOA)-related measurements. In a variant, the reference signal time difference (RSTD)-related information may comprise at least one of at least one reference signal time difference (RSTD) measurement over time, or at least one reference signal time difference (RSTD) bias estimate over time. In a variant, the non-line of sight (NLOS) bias information may further comprise at least one local non-line of sight (NLOS) bias distribution. In a variant, the non-line of sight (NLOS) bias information may be included in at least one radio resource control (RRC) message or may be provided using the new radio positioning protocol A (NRPPa), or may be provided using the long-term evolution positioning protocol (LPP).

In a variant, the method may include determining at least one estimation of at least one non-line of sight (NLOS) bias distribution and at least one statistical parameter associated with representing the at least one non-line of sight (NLOS)

bias distribution. In a variant, determining the at least one estimation of the at least one non-line of sight (NLOS) bias distribution may be based on at least one of at least one network-based downlink time difference of arrival (DL-TDOA) positioning-related measurement report, or at least one non-line of sight (NLOS) bias report gathered using at least one minimization of drive test (MDT) mechanism. In a variant, the at least one network-based downlink time difference of arrival (DL-TDOA) positioning-related measurement report may comprise at least one reference signal time difference (RSTD)-related measurement report performed during at least one network-based positioning.

In a variant, the at least one non-line of sight (NLOS) bias report gathered using the at least one minimization of drive test (MDT) mechanism may comprise at least one of at least one reference signal time difference (RSTD)-related measurement, or at least one reference signal time difference (RSTD)-related bias estimate, or wherein the non-line of sight (NLOS) bias information further comprises at least one local non-line of sight (NLOS) bias distribution. In a variant, the at least one statistical parameter may comprise at least one of at least one mean of at least one mixture of Gaussian distributions of non-line of sight (NLOS) bias, at least one standard deviation of the at least one mixture of Gaussian distributions of non-line of sight (NLOS) bias, and at least one weight corresponding to Gaussian distributions included in the at least one mixture of Gaussian distributions. In a variant, the method may include transmitting information that identifies at least one quantity of reference signal time difference (RSTD)-related measurement used to calculate the at least one statistical parameter.

In a variant, the method may include receiving at least one request for the non-line of sight (NLOS) bias distribution information. In a variant, the at least one request may further comprise information that identifies at least one of at least one accuracy threshold associated with at least one user equipment (UE)-based positioning, or at least one subscription associated with the at least one user equipment (UE). In a variant, receiving the at least one request may further comprise receiving the at least one request using the long-term evolution positioning protocol (LPP).

In a variant, receiving the at least one request may further comprises receiving the at least one request in association with at least one downlink time difference of arrival (DL-TDOA) information element (IE). In a variant, the method may include transmitting at least one indication that the non-line of sight (NLOS) bias distribution information is available, and receiving the at least one request may further comprise receiving the at least one request based on transmitting the at least one indication. In a variant, the at least one non-line of sight (NLOS) bias distribution may comprise at least one of a number of Gaussian distributions in the at least one mixture of Gaussian distributions, at least one mean of at least one Gaussian distribution included in the at least one mixture of Gaussian distributions, and at least one variance of at least one Gaussian distribution included in the mixture of Gaussian distributions.

In a variant, determining the at least one statistical parameter may be based on at least one probability distribution function (PDF). In a variant, the at least one probability distribution function (PDF) may be based on at least one reference signal time difference (RSTD) measurement and at least one corresponding user equipment (UE) location estimate. In a variant, determining the at least one statistical parameter may further comprise determining the at least one statistical parameter using at least one curve-fitting technique. In a variant, the non-line of sight (NLOS) bias distribution information may be associated with information that identifies at least one location of at least one network node.

In a variant, the method may include determining whether at least one value of the at least one statistical parameter has been previously provided, and transmitting the non-line of sight (NLOS) bias distribution information may further comprise transmitting the non-line of sight (NLOS) bias distribution information based on determining whether the at least one value of the at least one statistical parameter has been previously provided. In a variant, transmitting the non-line of sight (NLOS) bias distribution information may further comprise transmitting the non-line of sight (NLOS) bias distribution information using the long-term evolution positioning protocol (LPP). In a variant, transmitting the non-line of sight (NLOS) bias distribution information may further comprise transmitting the non-line of sight (NLOS) bias distribution information in association with at least one downlink time difference of arrival (DL-TDOA) information element (IE).

According to a third embodiment, a method may include transmitting at least one minimization of drive test (MDT) report that includes non-line of sight (NLOS) bias information. The non-line of sight (NLOS) bias information may include reference signal time difference (RSTD)-related information or time of arrival (TOA)-related measurements.

A fourth embodiment may be directed to an apparatus including at least one processor and at least one memory comprising computer program code. The at least one memory and computer program code may be configured, with the at least one processor, to cause the apparatus at least to perform the method according to the first embodiment, the second embodiment, or the third embodiment, or any of the variants discussed above.

A fifth embodiment may be directed to an apparatus that may include circuitry configured to perform the method according to the first embodiment, the second embodiment, or the third embodiment, or any of the variants discussed above.

A sixth embodiment may be directed to an apparatus that may include means for performing the method according to the first embodiment, the second embodiment, or the third embodiment, or any of the variants discussed above.

A seventh embodiment may be directed to a computer readable medium comprising program instructions stored thereon for performing at least the method according to the first embodiment, the second embodiment, or the third embodiment, or any of the variants discussed above.

An eighth embodiment may be directed to a computer program product encoding instructions for performing at least the method according to the first embodiment, the second embodiment, or the third embodiment, or any of the variants discussed above.

PARTIAL GLOSSARY

BLA Blind Learning Algorithm
gNB 5G Base Station
LMF Location Management Function
LPP LTE Positioning Protocol
MDT Minimization of Drive Test
NLOS Non-Line of Sight
NR New Radio (5G)
NRPPa New Radio Positioning Protocol A
OTDOA Observed Time Difference of Arrival
PDF Probability Density Function
PRS Positioning Reference Signal RSTD Reference Signal Time Difference
TA Timing Advance
TOA Time of Arrival
UE User Equipment

We claim:

1. A method, comprising:
receiving, by a user equipment (UE), non-line of sight (NLOS) bias distribution information, wherein the non-line of sight (NLOS) bias distribution information includes at least one statistical parameter associated with representing at least one non-line of sight (NLOS) bias distribution; and
performing, by the user equipment (UE), at least one calculation of at least one position using the non-line of sight (NLOS) bias distribution information,
wherein the method further comprises:
transmitting at least one minimization of drive test (MDT) report that includes non-line of sight (NLOS) bias information, wherein the non-line of sight (NLOS) bias information includes reference signal time difference (RSTD)-related information or time of arrival (TOA)-related measurements.

2. The method according to claim 1, wherein the reference signal time difference (RSTD)-related information comprises at least one of:
at least one reference signal time difference (RSTD) measurement over time, or
at least one reference signal time difference (RSTD) bias estimate over time, or
wherein the non-line of sight (NLOS) bias information further comprises at least one local non-line of sight (NLOS) bias distribution.

3. The method according to claim 1, wherein the non-line of sight (NLOS) bias information is included in at least one radio resource control (RRC) message or is provided using the long-term evolution positioning protocol (LPP).

4. The method according to claim 1, further comprising:
determining whether the non-line of sight (NLOS) bias distribution information is outdated based on at least one timer.

5. The method according to claim 1, further comprising:
providing at least one request for the non-line of sight (NLOS) bias distribution information prior to receiving the non-line of sight (NLOS) bias distribution information.

6. The method according to claim 5, wherein providing the at least one request for the non-line of sight (NLOS) bias distribution information is based on the user equipment (UE) performing, or determining to perform, at least one user equipment (UE)-based positioning.

7. An apparatus, comprising:
at least one processor; and
at least one memory including computer program code,
wherein the at least one memory and the computer program code are configured to, with the at least one processor, cause the apparatus at least to:
receive non-line of sight (NLOS) bias distribution information, wherein the non-line of sight (NLOS) bias distribution information includes at least one statistical parameter associated with representing at least one non-line of sight (NLOS) bias distribution; and
perform at least one calculation of at least one position using the non-line of sight (NLOS) bias distribution information,
wherein the at least one memory and the computer program code are further configured to, with the at least one processor, cause the apparatus at least to:
provide at least one request for the non-line of sight (NLOS) bias distribution information prior to receiving the non-line of sight (NLOS) bias distribution information.

8. The apparatus according to claim 7, wherein the at least one memory and the computer program code are further configured to, with the at least one processor, cause the apparatus at least to:
transmit at least one minimization of drive test (MDT) report that includes non-line of sight (NLOS) bias information, wherein the non-line of sight (NLOS) bias information includes reference signal time difference (RSTD)-related information or time of arrival (TOA)-related measurements.

9. The apparatus according to claim 8, wherein the reference signal time difference (RSTD)-related information comprises at least one of:
at least one reference signal time difference (RSTD) measurement over time, or
at least one reference signal time difference (RSTD) bias estimate over time, or
wherein the non-line of sight (NLOS) bias information further comprises at least one local non-line of sight (NLOS) bias distribution.

10. The apparatus according to claim 8, wherein the non-line of sight (NLOS) bias information is included in at least one radio resource control (RRC) message or is provided using the long-term evolution positioning protocol (LPP).

11. The apparatus according to claim 8, wherein the at least one memory and the computer program code are further configured to, with the at least one processor, cause the apparatus at least to:
determine whether the non-line of sight (NLOS) bias distribution information is outdated based on at least one timer.

12. The apparatus according to claim 7, wherein the at least one request for the non-line of sight (NLOS) bias distribution information is provided based on the user equipment (UE) performing, or determining to perform, at least one user equipment (UE)-based positioning.

13. A non-transitory computer readable medium comprising program instructions for causing an apparatus to perform at least the following:
receiving the non-line of sight (NLOS) bias distribution information, wherein the non-line of sight (NLOS) bias distribution information includes at least one statistical parameter associated with representing at least one non-line of sight (NLOS) bias distribution; and
performing at least one calculation of at least one position using the non-line of sight (NLOS) bias distribution information,
the non-transitory computer readable medium further comprising program instructions for causing the apparatus to perform at least following:
providing at least one request for the non-line of sight (NLOS) bias distribution information prior to receiving the non-line of sight (NLOS) bias distribution information.

14. The non-transitory computer readable medium according to claim 13, further comprising program instructions for causing the apparatus to perform at least following:
transmitting at least one minimization of drive test (MDT) report that includes non-line of sight (NLOS) bias information, wherein the non-line of sight (NLOS) bias information includes reference signal time difference (RSTD)-related information or time of arrival (TOA)-related measurements.

15. The non-transitory computer readable medium according to claim 14, wherein the reference signal time difference (RSTD)-related information comprises at least one of:
   at least one reference signal time difference (RSTD) measurement over time, or
   at least one reference signal time difference (RSTD) bias estimate over time, or
   wherein the non-line of sight (NLOS) bias information further comprises at least one local non-line of sight (NLOS) bias distribution.

16. The non-transitory computer readable medium according to claim 14, wherein the non-line of sight (NLOS) bias information is included in at least one radio resource control (RRC) message or is provided using the long-term evolution positioning protocol (LPP).

17. The non-transitory computer readable medium according to claim 14, further comprising program instructions for causing the apparatus to perform at least following:
   determining whether the non-line of sight (NLOS) bias distribution information is outdated based on at least one timer.

* * * * *